US011015956B2

(12) United States Patent
Tang et al.

(10) Patent No.: US 11,015,956 B2
(45) Date of Patent: May 25, 2021

(54) SYSTEM AND METHOD FOR AUTOMATIC SENSOR CALIBRATION

(71) Applicant: SZ DJI TECHNOLOGY CO., LTD, Shenzhen (CN)

(72) Inventors: Ketan Tang, Shenzhen (CN); Yongjian Zhao, Shenzhen (CN); Bing Li, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 933 days.

(21) Appl. No.: 15/432,802

(22) Filed: Feb. 14, 2017

(65) Prior Publication Data

US 2017/0153122 A1    Jun. 1, 2017

Related U.S. Application Data

(63) Continuation of application No. PCT/CN2014/084502, filed on Aug. 15, 2014.

(51) Int. Cl.
*G01C 22/02* (2006.01)
*G01C 25/00* (2006.01)
(Continued)

(52) U.S. Cl.
CPC ............ *G01C 25/00* (2013.01); *B64C 39/024* (2013.01); *B64D 47/08* (2013.01); *G01C 23/00* (2013.01);
(Continued)

(58) Field of Classification Search
CPC ...... G01C 25/00; G01C 23/00; B64C 39/024; B64D 47/08; G06T 2207/10032; G06T 7/80
See application file for complete search history.

(56) References Cited

U.S. PATENT DOCUMENTS 5,506,794 A    4/1996  Lange
5,892,690 A    4/1999  Boatman et al.
(Continued)

FOREIGN PATENT DOCUMENTS

CA    2782275 A1    4/2013
CN    201262709 Y    6/2009
(Continued)

OTHER PUBLICATIONS

Delory. Design and analysis of a navigation system using the federated filter. Air Force Institute of Technologu. Thesis. Dec. 1995. 124 pages.
(Continued)

*Primary Examiner* — Redhwan K Mawari
(74) *Attorney, Agent, or Firm* — Anova Law Group, PLLC

(57) ABSTRACT

A method for in-line sensor calibration are provided, comprising: obtaining sensor data from a plurality of sensors of different types coupled to an unmanned aerial vehicle (UAV) while the UAV is in flight, wherein the plurality of sensors have an initial spatial configuration relative to one another; detecting, with aid of a processor, a change in a spatial configuration of the plurality of sensors relative to one another from the initial spatial configuration to a subsequent spatial configuration, based on the sensor data; determining the subsequent spatial configuration; and adjusting data, while the UAV is in flight, from at least one of the plurality of sensors based on the subsequent spatial configuration. The disclosure also relates to an apparatus for sensor calibration.

18 Claims, 11 Drawing Sheets

(51) Int. Cl.
*G06T 7/80* (2017.01)
*B64C 39/02* (2006.01)
*B64D 47/08* (2006.01)
*G01C 23/00* (2006.01)

(52) U.S. Cl.
CPC ...... *G06T 7/80* (2017.01); *G06T 2207/10032* (2013.01)

(56) References Cited

U.S. PATENT DOCUMENTS

| | | | | |
|---|---|---|---|---|
| 6,285,959 | B1* | 9/2001 | Greer | G01B 11/002 356/139.03 |
| 6,405,135 | B1 | 6/2002 | Adriany et al. | |
| 6,577,976 | B1* | 6/2003 | Hoff | G01C 17/38 324/246 |
| 7,991,550 | B2* | 8/2011 | Zeng | G01S 7/4026 701/301 |
| 8,001,860 | B1* | 8/2011 | Preston | B60W 40/11 73/866.5 |
| 8,305,430 | B2 | 11/2012 | Oskiper et al. | |
| 8,364,334 | B2 | 1/2013 | Au et al. | |
| 8,483,960 | B2 | 7/2013 | Smitherman | |
| 8,543,266 | B2* | 9/2013 | Li | G05D 1/0883 701/13 |
| 9,128,185 | B2* | 9/2015 | Zeng | G01S 17/86 |
| 2002/0198656 | A1* | 12/2002 | Ford | G01C 21/165 701/472 |
| 2004/0030464 | A1* | 2/2004 | Buchler | F41G 7/007 701/4 |
| 2004/0150557 | A1* | 8/2004 | Ford | G01C 21/165 342/357.32 |
| 2004/0257441 | A1 | 12/2004 | Pevear et al. | |
| 2005/0060092 | A1* | 3/2005 | Hablani | B64G 1/24 701/472 |
| 2007/0023579 | A1* | 2/2007 | Wang | B64G 1/244 244/158.6 |
| 2008/0046138 | A1* | 2/2008 | Fowell | B64G 1/244 701/13 |
| 2008/0215204 | A1* | 9/2008 | Roy | G05D 1/0044 701/28 |
| 2008/0300787 | A1* | 12/2008 | Zeng | G01S 7/4026 701/301 |
| 2009/0299494 | A1* | 12/2009 | Kahn | G05B 13/04 700/28 |
| 2010/0228481 | A1* | 9/2010 | Kamel | G01C 21/00 701/530 |
| 2010/0235129 | A1* | 9/2010 | Sharma | G01S 7/4972 702/97 |
| 2010/0250022 | A1* | 9/2010 | Hines | G05D 1/0094 701/2 |
| 2011/0153035 | A1 | 6/2011 | Grichnik et al. | |
| 2012/0203486 | A1* | 8/2012 | Almalki | G01C 17/28 702/96 |
| 2012/0215477 | A1* | 8/2012 | Tuck | G01P 21/00 702/99 |
| 2013/0085628 | A1* | 4/2013 | Li | B64G 1/244 701/13 |
| 2013/0182906 | A1* | 7/2013 | Kojo | G01S 11/12 382/103 |
| 2014/0341465 | A1* | 11/2014 | Li | G06K 9/00664 382/160 |
| 2015/0160658 | A1* | 6/2015 | Reedman | G05D 1/102 701/3 |
| 2015/0212391 | A1* | 7/2015 | Waibel | H04N 5/2251 701/2 |
| 2015/0370250 | A1* | 12/2015 | Bachrach | B64D 47/08 701/2 |
| 2016/0061476 | A1 | 3/2016 | Schultz et al. | |
| 2016/0066068 | A1 | 3/2016 | Schultz et al. | |
| 2016/0076892 | A1* | 3/2016 | Zhou | G01C 21/165 701/3 |
| 2016/0153884 | A1 | 6/2016 | Han et al. | |
| 2016/0370203 | A1* | 12/2016 | Hallberg | G01C 25/005 |
| 2017/0068252 | A1* | 3/2017 | Yu | G05D 1/0858 |
| 2017/0153122 | A1* | 6/2017 | Tang | B64D 47/08 |
| 2017/0176034 | A1 | 6/2017 | Hussain et al. | |
| 2017/0208493 | A1 | 7/2017 | Masson et al. | |
| 2017/0221226 | A1* | 8/2017 | Shen | G06T 7/80 |
| 2018/0246529 | A1* | 8/2018 | Hu | G05D 1/0202 |
| 2019/0018428 | A1* | 1/2019 | Liu | B64C 39/024 |
| 2020/0141969 | A1* | 5/2020 | Zhang | G01P 1/122 |

FOREIGN PATENT DOCUMENTS

| | | |
|---|---|---|
| CN | 102607592 A | 7/2012 |
| CN | 103033185 A | 4/2013 |
| CN | 103810701 A | 5/2014 |
| CN | 103914065 A | 7/2014 |
| EP | 2578995 A2 | 4/2013 |
| JP | 2003329510 A | 11/2003 |
| JP | 2013144539 A | 7/2013 |
| JP | 2016540211 A | 12/2016 |
| KR | 20130079881 A | 7/2013 |
| KR | 101340158 B1 | 12/2013 |

OTHER PUBLICATIONS

International search report and written opinion dated Apr. 29, 2015 for PCT/CN2014/084502.

* cited by examiner

SYSTEM AND METHOD FOR AUTOMATIC SENSOR CALIBRATION

BACKGROUND OF THE INVENTION

Modern unmanned aerial vehicles (UAVs), with their small sizes and flexibility, have become widely used in a variety of civilian applications such as surveillance and tracking, remote sensing, search and rescue, scientific research, entertainment and hobbies, and the like. UAVs are typically controlled wirelessly by remote control equipment and/or by onboard control programs via communication links, and the performance of such communication links can have a direct impact on the safety and effectiveness of the UAV's missions. Challenges may arise during a UAV's mission when sensors drift away from an initial configuration.

SUMMARY OF THE INVENTION

When an unmanned aerial vehicle (UAV) is equipped with multiple sensors, one useful application of the UAV is to collect a large amount of data. Non-limiting examples include taking pictures of a terrain, capturing audio data, measuring pollution levels in the air, and monitoring air quality of a region. Before a UAV takes off, typically it is calibrated to perfect the data collection. When the UAV is in operation (including but not limited to while the UAV in flight), calibration can be made remotely through wireless communications. Nevertheless, in many occasions the UAV may travel out of the range of wireless communications, so remote calibration is not feasible. The UAV may have a sensor apparatus having an internal configuration or set of parameters for the sensors. When the apparatus setting drifts away from an initial or optimal configuration, the collected data becomes unreliable or less precise. To overcome this difficulty, the subject matter described herein discloses on board systems and methods to automatically calibrate UAVs and sensors. The automatic calibration may take place during a UAV flight (e.g., an in-line calibration), and may streamline the data collection process. In particular, avoiding collecting useless data or improving data quality can reduce cost significantly.

In one aspect, disclosed herein is a method of sensor calibration. The method comprises obtaining sensor data from a plurality of sensors of different types coupled to an unmanned aerial vehicle (UAV) while the UAV is in flight, wherein the plurality of sensors have an initial spatial configuration relative to one another; detecting, with aid of a processor, a change in a spatial configuration of the plurality of sensors relative to one another from the initial spatial configuration to a subsequent spatial configuration, based on the sensor data; determining the subsequent spatial; and adjusting data, while the UAV is in flight, from at least one of the plurality of sensors based on the subsequent spatial configuration.

In another aspect, disclosed herein is an apparatus for in-line sensor calibration, the apparatus comprising: (a) a plurality of sensors of different types (i) coupled to an unmanned aerial vehicle (UAV) and (ii) configured to provide sensor data while the UAV is in flight, wherein the plurality of sensors have an initial spatial configuration relative to one another; and (b) one or more processors that are, individually or collectively, configured to (i) detect a change in a spatial configuration of the plurality of sensors relative to one another from the initial spatial configuration to a subsequent spatial configuration, based on the sensor data; (ii) determine the subsequent spatial configuration; and (iii) adjust data, while the UAV is in flight, from at least one of the plurality of sensors based on the subsequent spatial configuration.

In another aspect, disclosed herein is a method of sensor calibration, said method comprising: obtaining sensor data from a plurality of sensors of different types coupled to an unmanned aerial vehicle (UAV); selecting a reference coordinate system; expressing, with aid of a processor, the sensor data from the plurality of sensors in the reference coordinate system based on a predicted spatial relationship between the sensors; detecting, with aid of the processor, a discrepancy in the sensor data between the plurality of sensors, said discrepancy indicative of an error in the predicted spatial relationship between the sensors; (e) determining an actual spatial configuration; and (f) adjusting data from at least one of the plurality of sensors based on the actual spatial configuration.

In another aspect, disclosed herein is an apparatus for sensor calibration, the apparatus comprising: (a) a plurality of sensors of different types (i) coupled to an unmanned aerial vehicle (UAV), and (ii) configured to provide sensor data; and (b) one or more processors that are, individually or collectively, configured to: (i) select a reference coordinate system; (ii) express the sensor data from the plurality of sensors in the reference coordinate system based on a predicted spatial relationship between the sensors; (iii) detecting a discrepancy in the sensor data between the plurality of sensors, said discrepancy indicative of an error in the predicted spatial relationship between the sensors; (iv) determining an actual spatial configuration; and (v) adjust data from at least one of the plurality of sensors based on the actual spatial configuration.

In another aspect, disclosed herein is a method of sensor calibration, said method comprising: obtaining sensor data from a plurality of sensors of different types coupled to an unmanned aerial vehicle (UAV); grouping, with aid of a processor, the plurality of sensors into a plurality of subsets, each subset having (i) at least two sensors, and (ii) a different combination of sensors; calculating, with aid of the processor, a predicted spatial relationship between the at least two sensors in each subset based on the sensor data; determining an actual spatial relationship between the at least two sensors in each subset based on the predicted spatial relationship; calculating, with aid of the processor, a spatial configuration of the plurality of sensors relative to one another based on the actual spatial relationship between the at least two sensors in each subset.

In another aspect, disclosed herein is an apparatus for sensor calibration, the apparatus comprising: (a) a plurality of sensors of different types (i) coupled to an unmanned aerial vehicle (UAV), and (ii) configured to provide sensor data; and (b) one or more processors that are, individually or collectively, configured to: (i) group the plurality of sensors into a plurality of subsets, each subset having (i) at least two sensors, and (ii) a different combination of sensors; (ii) calculate a predicted spatial relationship between the at least two sensors in each subset based on the sensor data; (iii) determine an actual spatial relationship between the at least two sensors in each subset based on the predicted spatial relationship; and (iv) calculate a spatial configuration of the plurality of sensors relative to one another based on the actual spatial relationship between the at least two sensors in each subset.

In another aspect, disclosed herein is a method of sensor calibration, said method comprising: obtaining sensor data from a plurality of sensors of different types; grouping, with aid of a processor, the plurality of sensors into a plurality of subsets, each subset having (i) at least two sensors comprising a reference sensor and one or more measurement sensors, and (ii) a different combination of sensors, wherein at least two of the plurality of subsets have different reference sensors; determining, with aid of the processor, an actual spatial relationship between the at least two sensors in each subset using at least one Kalman filter per subset based on the sensor data; and calculating, with aid of the processor a spatial configuration of the plurality of sensors relative to one another based on the actual spatial relationship between the at least two sensors in each subset.

In another aspect, disclosed herein is an apparatus for sensor calibration, the apparatus comprising: (a) a plurality of sensors of different types configured to provide sensor data; and (b) one or more processors that are, individually or collectively, configured to: (1) group the plurality of sensors into a plurality of subsets, each subset having (i) at least two sensors comprising a reference sensor and one or more measurement sensors, and (ii) a different combination of sensors, wherein at least two of the plurality of subsets have different reference sensors; (2) determine an actual spatial relationship between the at least two sensors in each subset using at least one Kalman filter per subset based on the sensor data; and (3) calculate a spatial configuration of the plurality of sensors relative to one another based on the actual spatial relationship between the at least two sensors in each subset.

Some or all of the systems and methods include a plurality of sensors of different types. The plurality of sensors of different types comprises at least two of the following: a vision sensor, a GPS sensor, an inertial sensor, an infrared sensor, an ultrasonic sensor, or a lidar sensor. At least one of the plurality of sensors is an inertial sensor, wherein the sensor data from the plurality of sensors is provided in a coordinate system associated with the inertial sensor.

In some embodiments, the initial spatial configuration of the systems and methods comprises an initial position and an initial orientation for each of the plurality of sensors relative to one another. The change in the spatial configuration comprises a change in the initial position and/or the initial orientation of at least one of the plurality of sensors relative to the other sensors of the plurality of sensors.

In some embodiments, the initial spatial configuration of the systems and methods is provided prior to takeoff of the UAV. Alternatively, the initial spatial configuration is provided during flight of the UAV.

In some embodiments, the change in the spatial configuration of the systems and methods is caused by movement of the UAV. In additional embodiments, the change in the spatial configuration is caused by vibration of the UAV.

In some instances the one or more processors determine the subsequent spatial configuration using a plurality of Kalman filters, the plurality of Kalman filters comprise one or more extended Kalman filters and/or unscented Kalman filters.

In some embodiments, the one or more processors of the systems and methods are on-board the UAV. Alternatively, the one or more processors are on a device external to the UAV and in communication with the UAV while the UAV is in flight.

In some embodiments, the plurality of sensors of different types of the systems and methods comprises at least two of the following: a vision sensor, a GPS sensor, an inertial sensor, an infrared sensor, an ultrasonic sensor, or a lidar sensor. At least one of the plurality of sensors is an inertial sensor. In certain instances, the reference coordinate system is a coordinate system associated with the inertial sensor In some embodiments, the predicted spatial relationship between the sensors is based on a predicted spatial change in the configuration from an initial spatial configuration of the sensors comprising an initial position and an initial orientation for each of the plurality of sensors relative to one another. In additional embodiments, the initial spatial configuration is provided prior to takeoff of the UAV or during flight of the UAV.

In some embodiments, spatial position and a relative spatial orientation of the sensors relative to one another.

In some applications, the actual spatial configuration of the sensors is determined while the UAV is in operation. The actual spatial configuration of the sensors is determined while the UAV is in flight. In some instances, the data from the at least one of the plurality of sensors is adjusted while the UAV is in operation.

In certain embodiments, the data adjusted based on the actual spatial configuration is image data captured by a vision sensor.

In various instances, each subset has a reference sensor and one or more measurement sensors. The reference sensor for each subset is the same or different.

In some embodiments, the systems and methods further comprises adjusting data from at least one of the plurality of sensors based on the spatial configuration. Additionally, the data adjusted based on the actual spatial configuration is image data captured by a vision sensor.

In various embodiments, the predicted spatial relationship between the sensors in each subset is based on a predicted spatial change in the configuration from an initial spatial configuration of the sensors comprising an initial position and an initial orientation for each of the plurality of sensors relative to one another. In further embodiments, the initial spatial configuration is provided prior to takeoff of the UAV or during flight of the UAV.

Some or all of the systems and/or methods comprise the predicted spatial relationship between the sensors including a relative spatial position and a relative spatial orientation of the sensors relative to one another.

In some embodiments, the systems and/or methods group the plurality of sensors into a plurality of subsets. Furthermore, the systems and/or methods calculate a predicted spatial relationship between the at least two sensors in each subset based on the sensor data; wherein the Kalman filter determines that actual spatial relationship based on the predicted spatial relationship.

It shall be understood that different aspects of the invention can be appreciated individually, collectively, or in combination with each other. Various aspects of the invention described herein may be applied to any of the particular applications set forth below or data communication between any other types of movable and/or stationary objects.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The systems, devices, and methods of the present invention provide sensors onboard an unmanned aerial vehicle (UAV) and methods of calibration of the sensors on board the UAV. Description of the UAV may be applied to any other type of unmanned vehicle, or any other type of movable object. Description of the vehicle may apply to any sensor found on board a UAV. Examples of sensors on board a UAV may include vision sensors, GPS, or IMU.

Systems, devices, and methods of the present invention provide sensors onboard an unmanned aerial vehicle (UAV) and methods of calibration of the sensors on board the UAV. Various aspects of the described disclosure may be applied to any of the applications identified here in addition to any vehicles comprising sensors. It shall be understood that different aspects of the invention may be appreciated individually, collectively, or in combination with each other.

Figure 1:
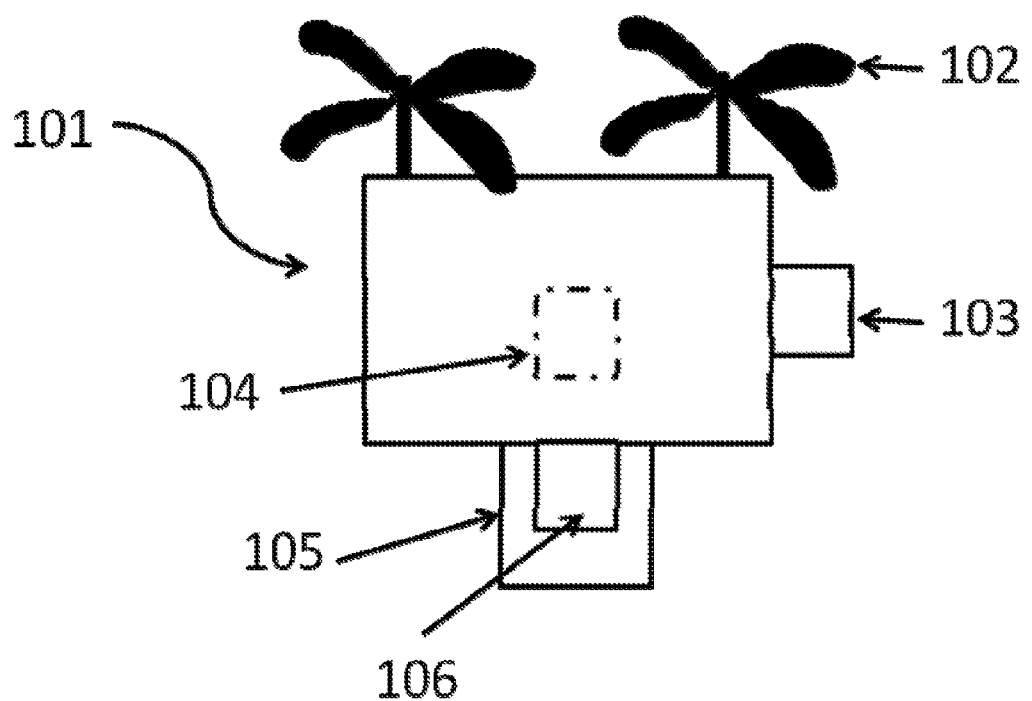
FIG. 1 is an example of a UAV with a plurality of on board sensors in accordance with an embodiment of the invention.

FIG. 1 shows an example of an unmanned aerial vehicle (UAV). Any description herein of a UAV 101 may apply to any type of movable object. The description of a UAV may apply to any type of unmanned movable object (e.g., which may traverse the air, land, water, or space). The UAV may be capable of responding to commands from a remote controller. The remote controller may be not connected to the UAV, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters.

The UAV 101 may be an aerial vehicle. The UAV 101 may have one or more propulsion units 102 that may permit the UAV 101 to move about in the air. The one or more propulsion units 102 may enable the UAV 101 to move about one or more, two or more, three or more, four or more, five or more, six or more degrees of freedom. In some instances, the UAV 101 may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV 101 may be able to move along one or more dimensions. For example, the UAV 101 may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 101 may be a rotorcraft. In some instances, the UAV 101 may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV 101 may have on board sensors that collect data while the UAV is in operation. The sensors may have initial configuration. The initial configuration of sensors can drift away from the initial and/or optimal setting. Therefore, automatic in-line calibration of the sensors when UAV is in flight can be beneficial, and in some cases necessary to preserve quality or reliability of the collected data. The subject matter described herein discloses on board systems and methods to automatically calibrate UAVs and sensors. The automatic in-line calibration systems and methods may facilitate the data collection process.

The UAV 101 may comprise vision sensors for example an image sensor may be a monocular camera, stereo vision camera, radar, sonar, or an infrared camera. The UAV 101 may further comprise location sensors, for example GPS, IMU, or LIDAR. The sensors onboard the UAV may collect information such as location of the UAV, location of other objects, orientation of the UAV 101, or environmental information. A single sensor may be able to fully determine any one of the aforementioned parameters or a group of sensors may work together to determine one of the listed parameters. Sensors may be used for mapping of a location, navigation between locations, detection of obstacles, or detection of a target.

The sensors may be located onboard or off board the UAV. The on board sensors may be located on the body of the UAV 101. The sensors 103 may be attached to the outside of the body of the UAV 101 and/or the sensor 104 may be attached to the inside of the body of the UAV 101. The sensors may be centrally located in a single region on the body. Alternatively, the sensors may be located in different locations on the body. The sensors may be permanently or removably attached to the UAV 101. The UAV 101 may have a carrier 105 which may be configured to carry a load. Sensors may be attached to the carrier 106.

The sensors may be characterized by one or more sensors parameters. The sensor parameters may be intrinsic or extrinsic parameters. An intrinsic parameter may relate to the internal configuration of a sensor. Example of intrinsic parameters may include focal length, scale factor, radial distortion coefficients, and tangential distortion coefficients. Intrinsic parameters may be any parameters that are dependent on hardware configurations, in some cases the intrinsic parameters may be set by a factory setting for the sensor. Extrinsic parameters may relate to the spatial relationship between any two or more sensors. Each sensor may have a relative coordinate system independent of other sensors on board the UAV. Extrinsic properties may be important for sensor fusion, combining data from sensors in different locations on the UAV. Sensor fusion may involve a process of transforming the relative coordinates of a given sensor to match the reference frame of another sensor.

Figure 2:
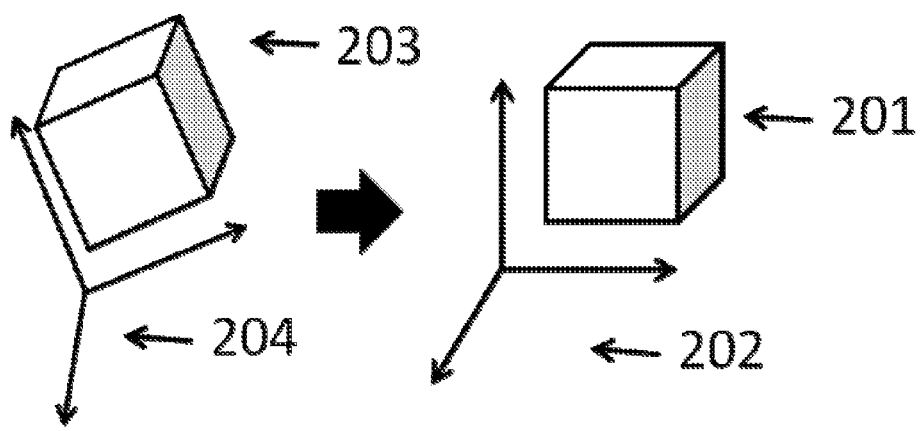
FIG. 2 is an example of a reference frame transformation in accordance with an embodiment of the invention.

FIG. 2 describes the process of transforming relative coordinates of a given sensor to match the reference frame of another sensor. FIG. 2 shows a cube as viewed by sensor 1 201 in the coordinate system of sensor 1 202 and a cube as viewed by sensor 2 203 in the coordinate system of sensor 2 204. A transformation may be conducted such that the coordinate system of sensor 2 204 is rotated to match the coordinate system of sensor 1 202. The transformation may be accounted for mathematically by a transformation matrix.

Intrinsic properties may be specific to a sensor and may vary infrequently. Recalibration of intrinsic properties may occur periodically while a UAV is not operating. It may not be critical to recalibrate intrinsic properties while the UAV 101 is operating because these properties remain relatively consistent while the UAV 101 is operating in comparison to extrinsic properties. Intrinsic properties may be calibrated by interpreting an image of a known calibration standard or target. Vanishing lines or points on a calibration standard or target may be used to calibrate the intrinsic properties such as focal length and distortion.

Extrinsic properties may change with a higher frequency compared to intrinsic properties. Shifting during landing and take-off of the UAV, vibration, and thermal drift may cause changes in the extrinsic properties of the sensors. For example a camera location may shift due to vibration of the UAV during flight. Extrinsic properties may deviate from their initial configuration while the UAV is in operation; therefore it may be preferably to perform a recalibration of the extrinsic properties while the UAV is operating. Recalibration of the extrinsic properties while the UAV 101 is operating may require computing resources, the computing resources may be onboard or offboard the UAV 101. The recalibration of extrinsic properties may occur with a set time frequency for example, the extrinsic properties may be recalibrated every 1 min, 5 min, 10 min, 20 min, 30 min, 40 min, 50 min, 1 hour, 2 hours, 3 hours, 4 hours, 5 hours, 10 hours, 12 hours, or once every day. Alternatively the recalibration of extrinsic properties may occur with a set distance frequency, for example a recalibration may occur every time the UAV 101 travels an additional 0.5 mile, 1 mile, 2 miles 3 miles, 4 miles, 5 miles, 10 miles, 15 miles, 20 miles, 25 miles, 30 miles, 35 miles, 40 miles 45 miles, 50 miles, or 100 from an initial starting location. The frequency of the onboard calibration of extrinsic properties may be decided based on the available computing resources, fuel or power requirements, or the flight conditions. Some flight conditions may decrease or increase the expected drift in the calibration of the extrinsic sensors, for example, if the UAV is flying at a low speed there may be less vibration of the body of the UAV and therefore less drift in the calibration of the extrinsic sensors.

The extrinsic parameters may have an initial calibration. The initial calibration of the extrinsic parameters may describe relative differences between the sensors, e.g., relative locations, rotations, and/or displacements of two or more sensors. The parameters may include changes to sensors over time, such as displacements of sensors between a certain time and a subsequent time. The displacements may include translational displacement and/or rotational displacement. The translational displacement may occur along one or more of the 3 axes. Similarly, the rotational displacement may occur in one or more of the 3 axes. In general, the calibration is achieved by a filtering process; non-limiting examples include various types of Kalman filters.

The calibration of the extrinsic parameters may be adjusted while the UAV 101 is in operation (e.g. in flight). A method of calibrating the extrinsic parameters may comprise detecting, with aid of a processor, a change in a spatial configuration of two or more sensors relative to one another from the initial spatial configuration to a subsequent spatial configuration. In further embodiments, the method determines the subsequent spatial configuration using filters, such as Kalman filters. Finally, the method may include adjusting data from at least one of the sensors while the UAV is in flight based on the subsequent spatial configuration.

The UAV may have one or more on board processors. The processors may be individually or collectively, configured to (i) detect a change in a spatial configuration of one or more sensors relative to one another from the initial spatial configuration to a subsequent spatial configuration, based on the sensor data; (ii) determine the subsequent spatial configuration using a plurality of Kalman filters; and (iii) adjust data, while the UAV is in flight, from at least one of the sensors based on the subsequent spatial configuration. Alternatively the processor or processors may be off board the UAV. The UAV may transmit information about the spatial configuration of a given sensor to an off board processor which may be configured to perform the aforementioned steps (i)-(iii) and transmit the information back to the UAV.

Calibration of Multiple Cameras

Figure 3:
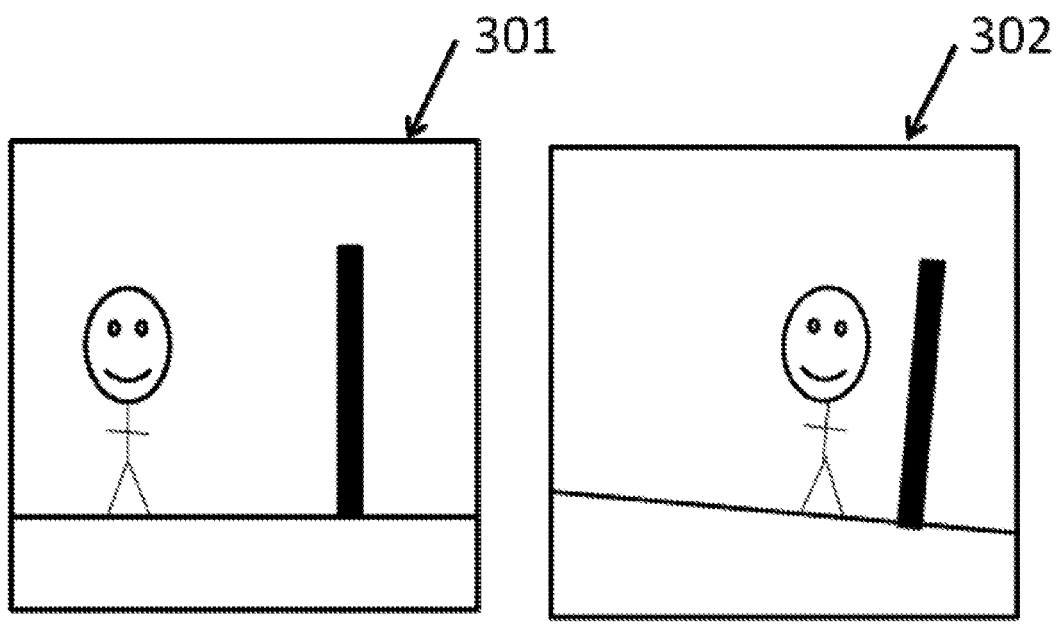
FIG. 3 is an example of an image from a stereo vision camera with a first and second camera in accordance with an embodiment of the invention.

In some embodiments, the systems and methods can include multiple sensors. Calibrating multiple sensors may comprise integrating sensor data. With reference to FIG. 3, one camera can take an image shown in 301, and another camera can take a second image 302 with different displacement and different orientation. Therefore, the two cameras need to be calibrated, and the calibration can utilize both the image 301 taken by the first camera and the second image 302 taken by the second camera. The following will disclose the mathematical formulation of calibrations.

In an embodiment, two or more cameras are assembled into a stereo camera system. The calibration of the two or more cameras is as follows. First, each camera takes an image. Then, an identification system selects N features. In terms of mathematical formulation, let $\alpha$ and $\beta$ denote two cameras. The features identified in their images are denoted by vectors $x_i^\alpha = (x_i^\alpha, y_i^\alpha)$ and $x_i^\beta = (x_i^\beta, y_i^\beta)$, where $i = 1, \ldots, N$. The features $x_i^\alpha$ and $x_i^\beta$ are determined by the coordinate systems of cameras α and β, respectively. To find a faithful mapping, the features need to be analyzed in a same reference coordinate system $X_i=(X_i, Y_i, Z_i)$. The relationship between features $x_i^\alpha$ and $x_i^\beta$ and the reference coordinate system $X_i$ can be described by projection: $\tilde{x}_i^\alpha \approx P^\alpha \tilde{X}_i$ and $\tilde{x}_i^\beta \approx P^\beta \tilde{X}_i$, where $\tilde{x}_i^\alpha$ and $\tilde{x}_i^\beta$ are features described in the normalized coordinates, namely $\tilde{x}_i^\alpha=(x_i^\alpha, y_i^\alpha, 1)$ and $\tilde{x}_i^\beta=(x_i^\beta, y_i^\beta, 1)$. $P^\alpha$ and $P^\beta$ are projections of cameras α and β, respectively, and they can be determined by the intrinsic parameters K and extrinsic parameters (e.g., rotation R and translation T): $P^\alpha=K^\alpha[R^\alpha T^\alpha]$ and $P^\beta=K^\beta[R^\beta P^\beta]$. Once the projections $P^\alpha$ and $P^\beta$ are computed and the intrinsic parameters $K^\alpha$ and $K^\beta$ are known, the extrinsic parameters R and T can be computed:

$$R = R^\beta (R^\alpha)^{-1},$$

$$T = T^\beta - R^\beta (R^\alpha)^{-1} T^\alpha$$

When parameters R and T are derived, the calibration is complete.

Typically, the intrinsic parameters $K^\alpha$ and $K^\beta$ do not change; even if they change, the amount of change is small. Therefore, the intrinsic parameters can be calibrated off-line. Namely, in some applications, the intrinsic parameters can be determined before the UAV takes off. In instances, the intrinsic parameters $K^\alpha$ and $K^\beta$ remain static during the flight, so the calibration is to compute optimal solutions for the $P^\alpha$ and $P^\beta$. An example uses minimizing projection errors to find solutions:

$$\min_{P^\alpha, P^\beta} \sum_{i=1}^{N} \left[ (\tilde{x}_i^\alpha - P^\alpha \tilde{X}_i)^2 + (\tilde{x}_i^\beta - P^\beta \tilde{X}_i)^2 \right]$$

This problem is a non-linear optimization problem. Various solution methods can be included in the embodiments. In some applications, solutions are achieved by bundle adjustment method. In the bundle adjustment method, projections $P^\alpha$ and $P^\beta$ are given initial values. Using epipolar constraint to derive essential matrix E, followed by a decomposition (e.g., singular value decomposition) that obtains $E=\lfloor T \rfloor_x R$ where $\lfloor T \rfloor_x$ is the skew symmetric matrix of T.

This solution finds a corresponding mapping between these features and the features in another image taken by another camera.

In some embodiments, the spatial configuration of two cameras α and β forming a stereo camera system arranges one camera on the left hand side and the other on the right hand side.

Calibration Across Camera and IMU

In some embodiments, the systems and methods include calibration across a camera and IMU. The principle of this calibration is based on acquiring multiple images over time by the camera and estimating the self-position changes by the camera. In some instances, the method of self-calibration is the similar to calibrating two impendent cameras by considering two images of the camera taken at different times i and i' as taken by two cameras α and β. Similarly, the self-calibration scheme can be applied to IMU. Let A and B denote self-coordinate changes of the camera and IMU, respectively. Place subscripts i to denote the coordinate system mappings $A_i$ and $B_i$ at time i=1, 2, ..., n. It follows that the mappings at time 2 relevant to time 1 are: $A=A_2 A_1^{-1}$ and $B=B_2 B_1^{-1}$. Let X denote the mapping between camera and IMU, the hand-eye calibration formula leads to AX=XB, wherein the A, B, X are normalized mapping with following form:

$$A = \begin{pmatrix} R_A & t_A \\ 0 & 1 \end{pmatrix}, B = \begin{pmatrix} R_B & t_B \\ 0 & 1 \end{pmatrix}, X = \begin{pmatrix} R_X & t_X \\ 0 & 1 \end{pmatrix}.$$

Furthermore, $R_A R_X = R_X R_B$ and $(R_A - 1) t_X = R_X t_B - t_A$. Following these equations and taking into account the properties of rotation matrices, there are multiple ways to solve $R_X$ and $t_X$. To guarantee a unique solution, a requirement on n≥3 needs to be enforced.

In some embodiments, the calibration is performed between a stereo camera system and an IMU. The calibration is achieved by calibrating one camera in the system with the IMU.

The UAV may comprise an apparatus configured to interpret sensor data in order to determine if the sensor requires recalibration. The apparatus may interpret sensor data in real time. The apparatus may interpret sensor data from any or all of the sensors onboard the UAV. The apparatus may comprise one or more sensors which may be coupled to the UAV. The sensors may provide information to the UAV about the environment, nearby objects, the location of the UAV, and/or information about nearby objects or obstacles. The sensors may have a known initial configuration which may include intrinsic and extrinsic properties. The initial configuration may comprise an initial position and orientation of a sensor relative to at least one other sensor. The initial configuration of the sensors may be communicated to a processor on board or off board prior to take off of the UAV or while the UAV is in flight. A processor may monitor changes in the configuration of the sensors that may occur as a result of movement or vibration of the UAV in order to perform an in-line sensor calibration in the event of a change in the configuration of the sensors.

Figure 4:
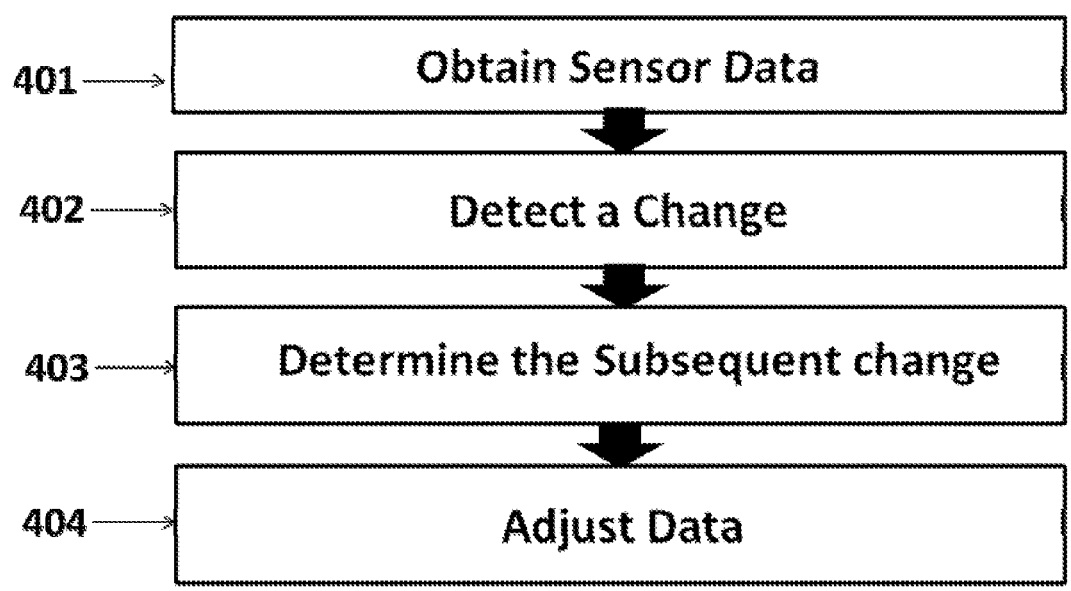
FIG. 4 is a flow chart showing the overall automated error detection and in-line calibration process.

A processor on board or off board the UAV may obtain the sensor data continuously or in discrete time intervals. FIG. 4 shows a flow chart describing the steps performed by the processor in performing an in-line sensor calibration. First the processor may obtain the sensor data 401. The sensors may have an initial spatial configuration relative to each other. The initial spatial configuration of the sensors may be known a-priori. The initial spatial configuration may be recorded and stored in a memory location on board the UAV prior to or after take-off of the UAV. The initial configuration may be the initial position and the initial orientation of a sensor relative to other sensors on board the UAV. Based on the sensor data received by the processor, the processor may detect a change in a spatial configuration of one or more sensors 402. The change in the spatial configuration of one or more of the sensors may be a change relative to the known initial configuration. Next the processor may determine the deviation of the new spatial configuration relative to the initial spatial configuration 403. The processor may employ one or more Kalman filters to determine the deviation of the new spatial configuration relative to the initial spatial configuration. The Kalman filters may be extended Kalman filters or unscented Kalman filters. The Kalman filters may all be of the same type or they may be different such that a fraction of the filters are extended and the remaining fraction can be unscented Kalman filters. After the deviation has been determined the processor can correct or adjust the data from the sensors to reflect the newly determined location of the sensors relative to each other 404. The adjustment of the data may occur while the UAV is in operation (e.g. while the UAV is in flight). The steps described in FIG. 4 may be performed by an apparatus containing the sensors and the processors. The apparatus may be coupled to the UAV.

The processor, or system of processors, which may be on board the UAV or at a location off board the UAV and in wireless or wired communication with UAV, may be configured to detect a deviation of the spatial configuration of one or more sensors relative to an initial spatial configuration. Detection of a deviation of the spatial configuration may involve the application of one or more statistical methods to the sensor data. One example of a statistical method that may be used to detect a deviation of the spatial configuration is a Mahalanobis distance method.

Figure 5:
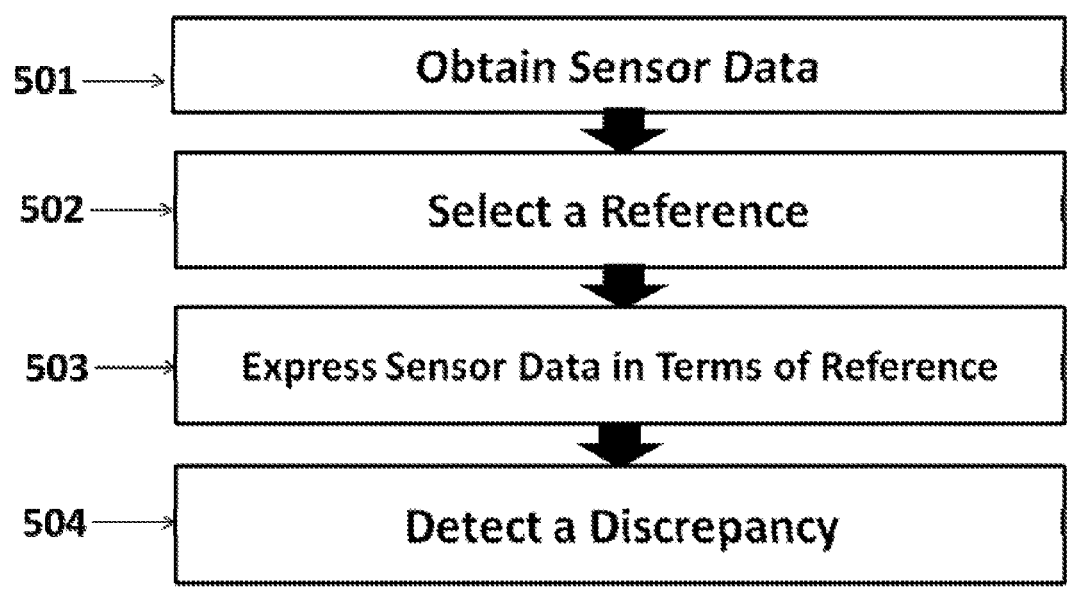
FIG. 5 is a flow chart showing the method of detecting a sensor error in accordance with an embodiment of the invention.

The processor may detect a discrepancy in the spatial configuration of one or more sensors using the method shown in FIG. 5. The processor may receive data from one or more sensors on board the UAV 501. The sensors may have different spatial orientations relative to each other such that the data from each sensor may have a different relative coordinate system. In order to interpret the data it may be preferable to transform the data to a consistent uniform reference coordinate system. The reference coordinate system may be an arbitrary coordinate system or it may be the relative coordinate system of one of the sensors, for example the coordinate system of the inertial measuring unit (IMU). The processor may choose a reference coordinate system in which to transform the data before interpreting the data 402. The reference coordinate system may be chosen before the UAV takes off or it may be chosen in flight. The reference coordinate system may be consistent throughout the time that the UAV is operating or it may vary over time. In some cases, the relative coordinate system of the IMU may be chosen as the reference coordinate system. The processor may collect the sensor data and express all of the data in a uniform reference coordinate system 503. After the data is transformed to a uniform reference coordinate system the data may be analyzed to detect discrepancies in the spatial configuration of one or more sensors 504. A discrepancy may be indicative of an error in an expected or predicted spatial relationship between one or more sensors. Detected discrepancies may indicate that the sensor or sensors require recalibration.

Detection of discrepancies in the spatial configuration of one or more sensors may be carried out using one or more statistical methods. In an example, the detection of discrepancies in the spatial configuration of one or more sensors may employ a Mahalanobis distance method. The Mahalanobis distance method may compare measurements from different sensors after the measurements have been transformed into a uniform reference coordinate system. The processor may detect discrepancies using the Mahalanobis distance method by generating a covariance matrix between the measurements from different sensors in a uniform reference coordinate system. The covariance matrix may be updated in real time as the processor receives measurement data from the sensors. The processor may calculate the Mahalanobis distance between the measurements from different sensors in a uniform reference coordinate system. If the Mahalanobis distance exceeds a preset threshold the Mahalanobis distance may indicate that the sensor is abnormal which may indicate that the sensors has drifted from its initial calibration. The preset threshold for a Mahalanobis distance to indicate an error may be at least 1, 2, 3, 4, 5, 6, 7, 8, 9, 10, 15, or 20. The threshold may be a uniform value for all of the sensors or the value may vary for each sensor. The threshold value may be fixed or it may vary with respect to an independent variable, for example time or distance traveled by the UAV.

Detection of a discrepancy indicated by a calculation of a Mahalanobis distance greater than a predetermined threshold value may initiate a recalibration of a sensor with the detected discrepancy. Detection of a discrepancy may result from the movement of a sensor away from the initial orientation of the sensor to a new spatial orientation. Sensors may move during take-off and landing of the UAV, during flights as a result of vibration of the UAV, or during flight as a result of an interaction with another object (for example interaction with an animal or insect, interaction with a natural feature (e.g. tree, cliff, waterfall), or an interaction with another UAV).

Recalibration of the sensor may require a step of determining the new spatial orientation of the sensor. The new spatial orientation of the sensor may be determined using one or more Kalman filters. The Kalman filters may be extended Kalman filters or unscented Kalman filters. The new spatial orientation determined by the Kalman filters may be used to update the external properties of one or more sensors, which may correspond to the spatial orientation, of the sensor or sensors with a detected discrepancy. The updated external properties may be used to adjust data from the sensors or sensors.

The Kalman filters may continuously update the sensor calibration using a recursive method. The Kalman filters may use the measurement data from the sensors and the constraint between the measurement data as a measuring formula.

All of the sensors may use a single Kalman filter to perform the calibration. Alternatively the calibration may be achieved by connecting a plurality of Kalman filters in parallel with each other. Each of the Kalman filters in the parallel architecture may be independent of the rest of the filters. Each Kalman filter may perform a calibration for one or more sensors. In cases where a Kalman filter is responsible for calibration of more than one sensor, the sensors calibrated by the Kalman filter may be related. Parallel Kalman filters may increase the expandability of the system. Furthermore parallel Kalman filters may increase the scalability of the system and also increase the speed of the response while decreasing the computing resources necessary to calibrate the sensors.

Figure 6:
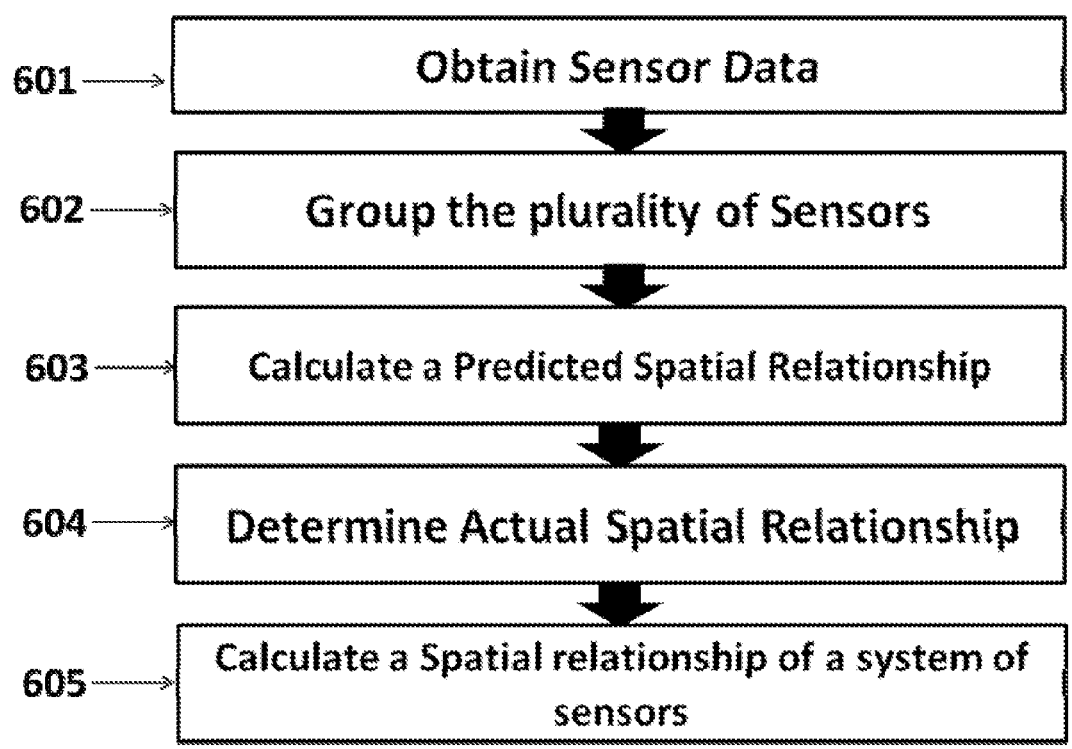
FIG. 6 is a flow chart showing the method of in-line calibration in accordance with an embodiment of the invention.

An example of a method of sensor calibration that may be executed by the system described herein is shown in FIG. 6. The first step of the method may be to obtain data from one or more sensors on board the UAV 601. The data may be collected by a processor that may be on board the UAV or at a location off board the UAV in which case the off board location may be in communication with the UAV wirelessly or through a wired connection. The processor may group the sensors into one or more subsets such that each subset has at least two sensors 602. Each subset may contain a group of measurement sensors. The subset may additionally have a reference sensor, the reference sensor may be the same for each subset or each subset may have a unique reference sensors. The subset of sensors may be related sensors, for example they may be sensors with a related function. Each subset may comprise a different subset of measurement sensors such that each subset is discrete and there is no overlap between the measurement subsets. For example, if there are five sensors, A, B, C, D, and E two subsets may be generated using these sensors. Subset 1 may comprise sensors A and B while subset 2 may comprise sensors C, D, and E. A grouping wherein subset 1 comprises A, B, and C and subset 2 comprises A, D, and E would not be permitted because sensor A is included in both subsets. After the sensors have been grouped into subsets the next step may be to calculate an expected spatial relationship between the sensors based on the data from the sensors 603. Next, the actual spatial relationship between the sensors may be determined using at least one Kalman filter 604. Each subset may have at least one Kalman filter for performing calculations using the sensor data. In the final step the spatial configuration of one or more sensors may be calculated using a processor 605. The calculation of the spatial configuration of the sensors may be based on the actual spatial relationship between the sensors in the subset as determined by one or more Kalman filters.

A UAV may comprise a plurality of sensors of different types. The plurality of sensors may be further organized in to groups of sensors or subsets; each subset may include at least two sensors comprising a reference sensor and one or more measurement sensors. Each subset may comprise a different subset of measurement sensors such that each subset is discrete and there is no overlap between the subsets. All of the subsets may have a single uniform reference sensor. For example, all of the subsets may be analyzed relative to the IMU, which may be chosen as the reference sensor. Alternatively each subset may have a different reference sensor. At least one Kalman filter per subset may determine an actual spatial relationship between the at least two sensors in each subset based on the sensor data. A plurality of Kalman filters may work in parallel to determine the actual spatial relationship between the sensors in a plurality of subsets. An additional calculation may be performed to determine the spatial configuration of the plurality of sensors relative to one another based on the actual spatial relationship between the at least two sensors in each subset.

Figure 7:
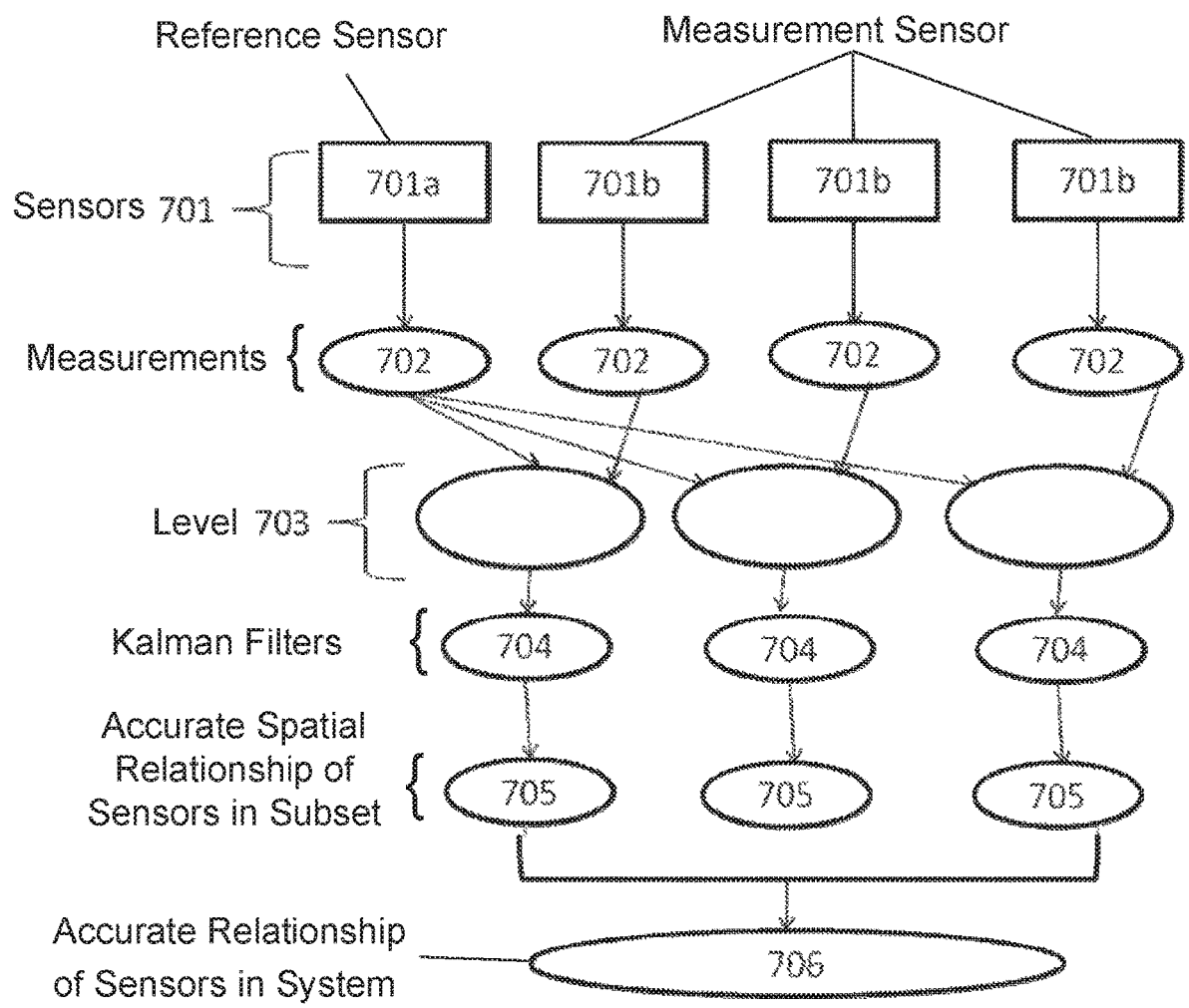
FIG. 7 is an example of a system architecture with a uniform reference sensor in accordance with an embodiment of the invention.

FIG. 7 graphically describes an example of a possible system architecture. At the top level the system may comprise a system of sensors or subset of sensors 701. One of the sensors may be designated as the reference sensor 701a. The remaining measurement sensors 701b may collect data in relative coordinate systems that are different from the relative coordinate system of the reference sensor 701a. The measurements 702 from the measurement sensors 701b may be transformed in to the coordinate system of the reference sensor 701a at level 703. After transformation the data from each subset may be substituted into a Kalman filter 704. Each subset of filters may substitute data into a different Kalman filter 704. The Kalman filters may determine the accurate spatial relationship of the sensors in the subset 705 and then the accurate relationship of the sensors in the system 706. The Kalman filters may be connected in parallel.

A sensor may be calibrated by the Kalman filter by first establishing a dynamic formula to describe the movement of the system and a transformation formula between a chosen sensor and a reference sensor. The dynamic formula for the system movement may primarily depend on data from the IMU including acceleration and angular acceleration of the system. Next the initial state of the Kalman filter may be determined, for example from factory settings. The initial state may be described by a state variable vector and a covariance matrix. For interoceptive sensors (e.g. IMU), measured data may be read directly, for exteroceptive sensors (e.g. camera), measured data may be obtained by selecting an appropriate observation spot based on external parameters of the sensor at a previous time step. In the final step the status of the Kalman filter may update by substituting the measured data into an updating formula in the Kalman filter. The updating formula may depend on the type of Kalman filter (e.g. extended or unscented).

Figure 8:
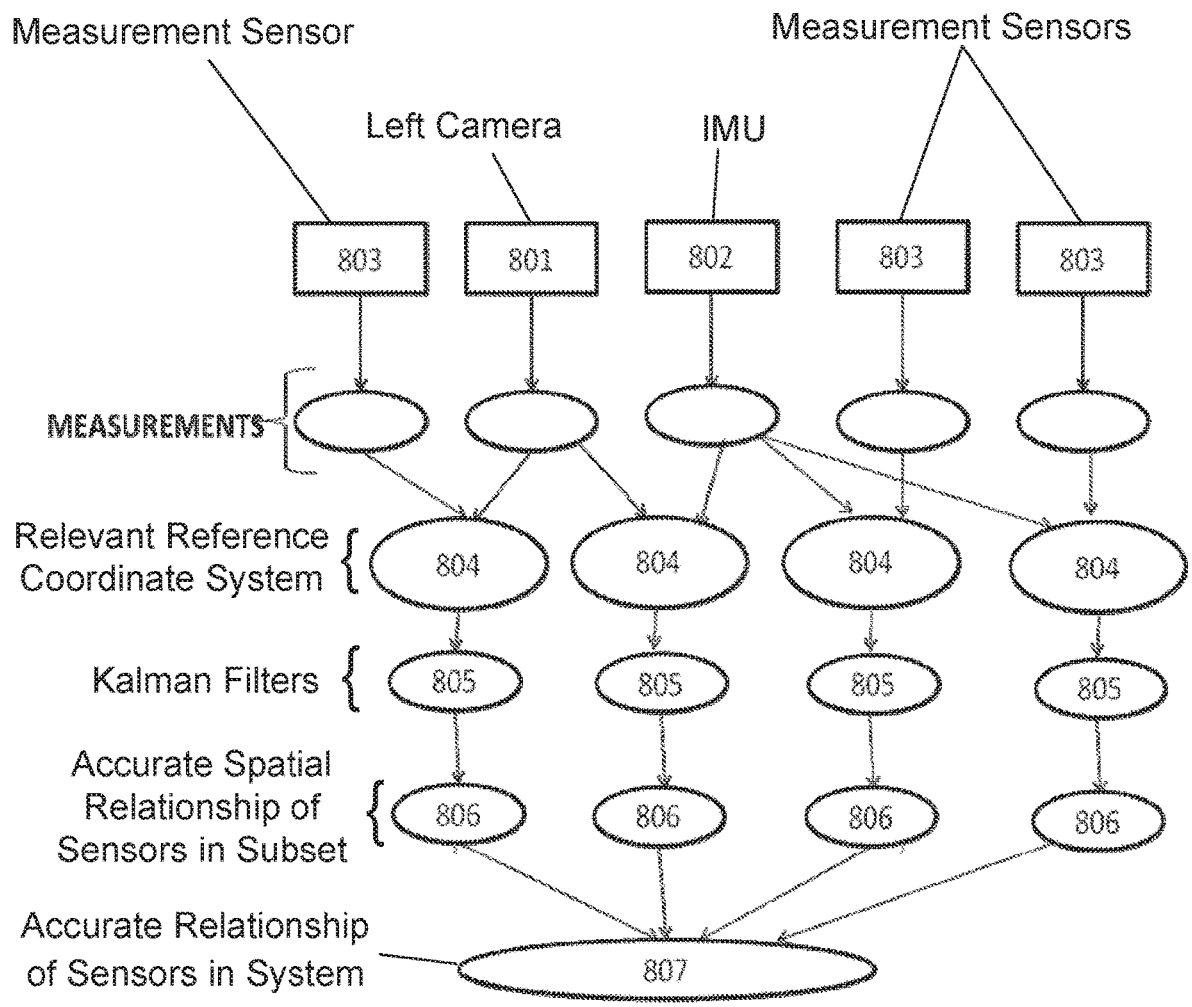
FIG. 8 is an example of a system architecture with a plurality of reference sensors in accordance with an embodiment of the invention.

An alternative example of a possible system architecture is shown graphically in FIG. 8. The system may have a plurality of sensors, which may be grouped into subsets. Each of the subsets may have a reference sensor. A reference sensor may be used for one or more subsets. In the example shown in FIG. 8 the left camera 801 and IMU 802 may be the reference sensors. The remaining sensors (for example, right camera, GPS, and Ultrasonic) may be the measurement sensors 803. Similarly to the procedure outlined in FIG. 7, each of the sensor measurements may be transformed into the relevant reference coordinate system 804. The transformed measurements may be calibrated using Kalman filters in series 805. The Kalman filters may be unscented or extended Kalman filters. The Kalman filters may determine the accurate spatial relationship of the sensors in the subset 806 and then the accurate relationship of the sensors in the system 807.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
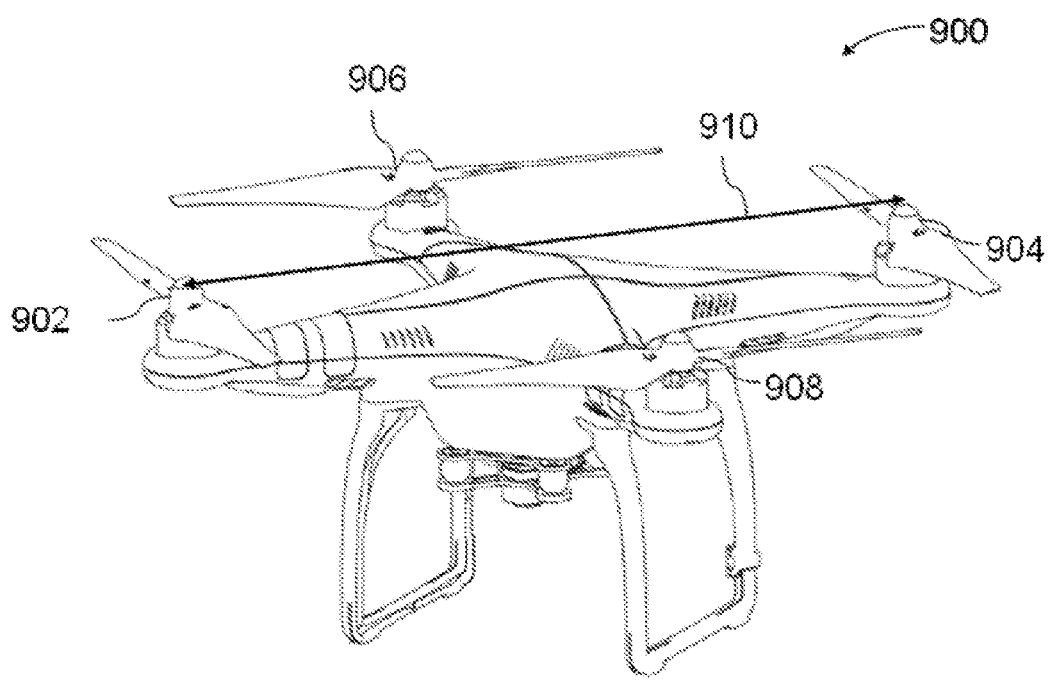
FIG. 9 illustrates an unmanned aerial vehicle, in accordance with an embodiment of the invention.

FIG. 9 illustrates an unmanned aerial vehicle (UAV) 900, in accordance with embodiments of the present invention. The UAV may be an example of a movable object as described herein. The UAV 900 can include a propulsion system having four rotors 902, 904, 906, and 908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
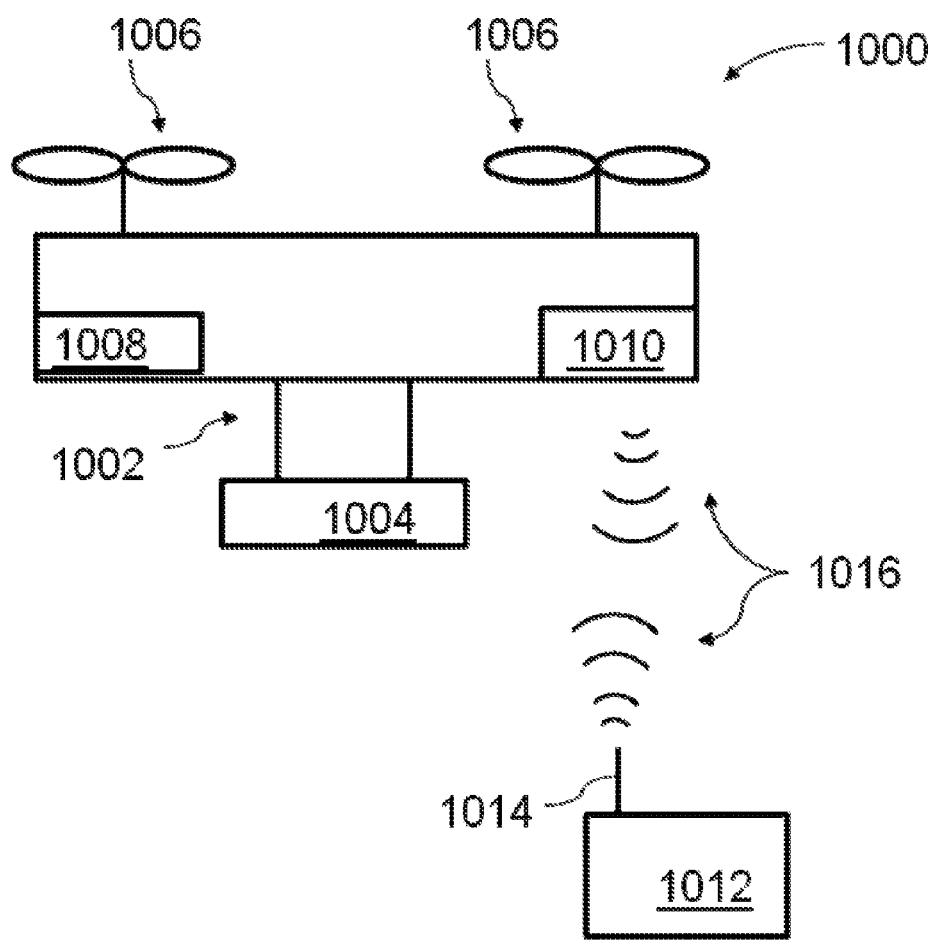
FIG. 10 illustrates a movable object including a carrier and a payload, in accordance with an embodiment of the invention.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems

1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
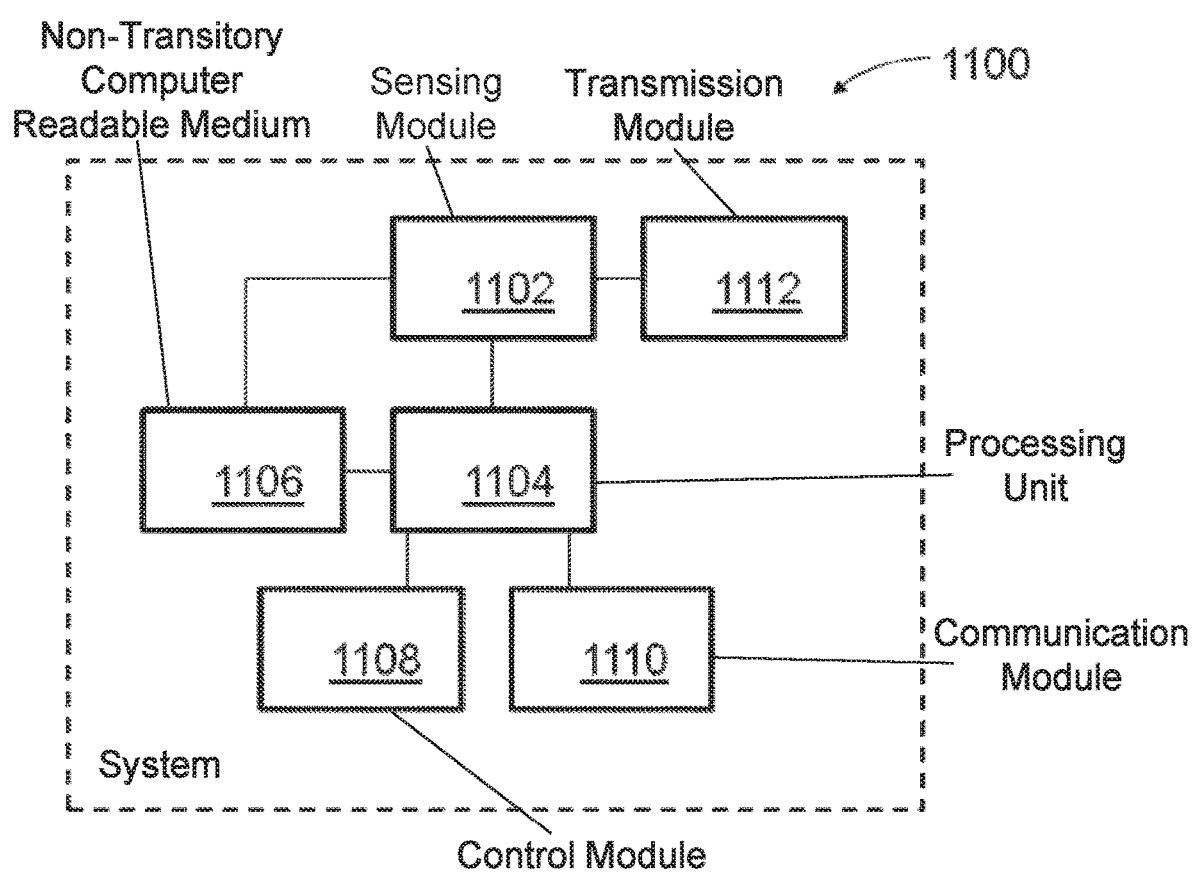
FIG. 11 is a schematic illustration by way of block diagram of a system for controlling a movable object, in accordance with an embodiment of the invention.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, UPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of in-line sensor calibration, said method comprising: obtaining sensor data from a plurality of sensors coupled to an unmanned aerial vehicle (UAV), wherein the plurality of sensors have an initial spatial configuration relative to one another; determining a frequency for performing a calibration based on flight parameters of the UAV including a speed of the UAV; and controlling to perform the calibration at the frequency, performing the calibration including: analyzing the sensor data to detect a change in a spatial configuration of the plurality of sensors relative to the initial spatial configuration; determining a subsequent spatial configuration of the plurality of sensors relative to one another based on the change; and adjusting the sensor data from at least one of the plurality of sensors based on the subsequent spatial configuration while the UAV is in flight; wherein the analyzing the sensor data further comprising: grouping the plurality of sensors into a plurality of subsets, each subset having at least two sensors and a different combination of sensors; calculating a predicted spatial relationship between the at least two sensors in each subset based on the sensor data; determining an actual spatial relationship between the at least two sensors in each subset based on the predicted spatial relationship; and calculating the spatial configuration of the plurality of sensors relative to one another, based on the actual spatial relationship between the at least two sensors in each subset.

2. The method of claim 1, wherein the plurality of sensors comprise at least one inertial sensor and at least one of the following sensors: a vision sensor, a GPS sensor, an infrared sensor, an ultrasonic sensor, or a lidar sensor.

3. The method of claim 1, wherein the initial spatial configuration comprises an initial position and an initial orientation for each of the plurality of sensors relative to one another, and wherein the change in the spatial configuration comprises a change in at least one of the initial position and the initial orientation of at least one of the plurality of sensors relative to the other sensors of said plurality.

4. The method of claim 2, wherein analyzing of the sensor data further comprises:
selecting a reference coordinate system; expressing the sensor data from the plurality of sensors in the reference coordinate system based on the predicted spatial relationship between the sensors; and
detecting a discrepancy in the sensor data between the plurality of sensors, wherein the discrepancy is indicative of an error in the predicted spatial relationship between the sensors.

5. The method of claim 4, wherein the predicted spatial relationship between the sensors is based on a predicted spatial change in the initial spatial configuration of the sensors, said initial spatial configuration comprising an initial position and an initial orientation for each of the plurality of sensors relative to one another.

6. The method of claim 4, wherein the predicted spatial relationship between the sensors comprises a relative spatial position and a relative spatial orientation of the sensors relative to one another.

7. The method of claim 1, wherein each subset comprises a reference sensor and one or more measurement sensors, wherein the predicted spatial relationship between the sensors in each subset is based on a predicted spatial change in the initial spatial configuration of the sensors, said initial spatial configuration comprising an initial position and an initial orientation for each of the plurality of sensors relative to one another.

8. The method of claim 7, wherein the predicted spatial relationship between the sensors comprises a relative spatial position and a relative spatial orientation of the sensors relative to one another.

9. The method of claim 1, wherein the sensor data adjusted comprises image data captured by a vision sensor selected from the plurality of sensors.

10. An apparatus for in-line sensor calibration, said apparatus comprising: a plurality of sensors coupled to an unmanned aerial vehicle (UAV) and configured to provide sensor data, wherein the plurality of sensors have an initial spatial configuration relative to one another; and one or more processors configured to: determine a frequency for performing a calibration based on flight parameters of the UAV including a speed of the UAV; and control to perform the calibration at the frequency, performing the calibration including: analyzing the sensor data to detect a change in a spatial configuration of the plurality of sensors relative to the initial spatial configuration; determining a subsequent spatial configuration of the plurality of sensors relative to one another based on the change; and adjusting the sensor data from at least one of the plurality of sensors based on the subsequent spatial configuration while the UAV is in flight;

wherein the one or more processors are further configured to: group the plurality of sensors into a plurality of subsets, each subset having at least two sensors and a different combination of sensors; calculate a predicted spatial relationship between the at least two sensors in each subset based on the sensor data; determine an actual spatial relationship between the at least two sensors in each subset based on the predicted spatial relationship; and calculate a spatial configuration of the plurality of sensors relative to one another based on the actual spatial relationship between the at least two sensors in each subset.

11. The apparatus of claim 10, wherein the plurality of sensors comprise at least one inertial sensor and at least one of the following sensors: a vision sensor, a GPS sensor, an infrared sensor, an ultrasonic sensor, or a lidar sensor.

12. The apparatus of claim 10, wherein the initial spatial configuration comprises an initial position and an initial orientation for each of the plurality of sensors relative to one another.

13. The apparatus of claim 12, wherein the change in the spatial configuration comprises a change in at least one of the initial position and the initial orientation of at least one of the plurality of sensors relative to the other sensors of said plurality.

14. The apparatus of claim 11, wherein the one or more processors are further configured to: select a reference coordinate system; express the sensor data from the plurality of sensors in the reference coordinate system based on the predicted spatial relationship between the sensors; detect a discrepancy in the sensor data between the plurality of sensors in the reference coordinate system, wherein the discrepancy is indicative of an error in the predicted spatial relationship between the sensors; determine an actual spatial configuration based on the discrepancy in the sensor data; and adjust the sensor data from at least one of the plurality of sensors based on the actual spatial configuration.

15. The apparatus of claim 14, wherein the predicted spatial relationship between the sensors is based on a predicted spatial change in the initial spatial configuration of the sensors, said initial spatial configuration comprising an initial position and an initial orientation for each of the plurality of sensors relative to one another.

16. The apparatus of claim 14, wherein the predicted spatial relationship between the sensors comprises a relative spatial position and a relative spatial orientation of the sensors relative to one another.

17. The apparatus of claim 10, wherein the predicted spatial relationship between the sensors in each subset is based on a predicted spatial change in the initial spatial configuration of the sensors, said initial spatial configuration comprising an initial position and an initial orientation for each of the plurality of sensors relative to one another.

18. The apparatus of claim 10, wherein the predicted spatial relationship between the sensors comprise a relative spatial position and a relative spatial orientation of the sensors relative to one another.

* * * * *